(12) United States Patent
Schneck et al.

(10) Patent No.: US 10,945,012 B2
(45) Date of Patent: Mar. 9, 2021

(54) COLD-START PODCAST RECOMMENDATIONS

(71) Applicant: Pandora Media, LLC, Oakland, CA (US)

(72) Inventors: Kristiana Elizabeth Schneck, Berkeley, CA (US); Steven Daniel Essinger, Oakland, CA (US); Adam James Hajari, Mountain View, CA (US); Christine Ho, Oakland, CA (US); Taylor Jaime Kirch, Champaign, IL (US); Mohamed Sordo, San Francisco, CA (US)

(73) Assignee: Pandora Media, LLC, Oakland, CA (US)

( * ) Notice: Subject to any disclaimer, the term of this patent is extended or adjusted under 35 U.S.C. 154(b) by 64 days.

(21) Appl. No.: 16/453,846

(22) Filed: Jun. 26, 2019

(65) Prior Publication Data

US 2020/0007917 A1     Jan. 2, 2020

Related U.S. Application Data

(60) Provisional application No. 62/691,438, filed on Jun. 28, 2018, provisional application No. 62/767,464, filed on Nov. 14, 2018.

(51) Int. Cl.
*H04N 21/25*     (2011.01)
*H04N 21/258*     (2011.01)
*H04N 21/235*     (2011.01)

(52) U.S. Cl.
CPC ....... *H04N 21/252* (2013.01); *H04N 21/2353* (2013.01); *H04N 21/25808* (2013.01); *H04N 21/25891* (2013.01)

(58) Field of Classification Search
CPC ................. H04N 21/251; H04N 21/25; H04N 21/25891; H04N 21/44222; H04N 21/4532; H04N 21/466; H04N 21/4668
See application file for complete search history.

(56) References Cited

U.S. PATENT DOCUMENTS

| | | | | |
|---|---|---|---|---|
| 8,069,232 B2 * | 11/2011 | Silverman | ......... | H04M 1/72527 709/222 |
| 8,108,378 B2 * | 1/2012 | Ott, IV | ................. | G06F 16/958 707/707 |
| 8,655,383 B2 * | 2/2014 | Feng | ....................... | H04L 67/18 455/456.3 |

(Continued)

*Primary Examiner* — Pankaj Kumar
*Assistant Examiner* — Timothy R Newlin
(74) *Attorney, Agent, or Firm* — Fenwick & West LLP

(57) ABSTRACT

A system and a method are disclosed for recommending podcasts. In an embodiment, the system detects a podcast request, and responsively determines whether a profile of the user indicates consumption by the user of podcasts. Responsive to determining that the profile does not indicate consumption by the user of podcasts, the system determines music preferences of the user based on data of the profile, and generates a podcast seed based on the music preferences. The system selects a podcast recommendation based on the podcast seed, and provides the podcast recommendation to the user. The system receives a selection of the podcast recommendation by the user, and responsively plays back a podcast corresponding to the podcast recommendation.

14 Claims, 7 Drawing Sheets

(56) References Cited

U.S. PATENT DOCUMENTS

| | | | | |
|---|---|---|---|---|
| 8,812,498 B2* | 8/2014 | Ingrassia, Jr. | ......... | G06F 16/635 |
| | | | | 707/732 |
| 9,170,712 B2* | 10/2015 | Durham | ................ | G06F 16/435 |
| 9,558,278 B2* | 1/2017 | Bachman | ............ | G06F 16/9535 |
| 9,678,637 B1* | 6/2017 | Brothers | ........ | H04N 21/234336 |
| 9,792,003 B1* | 10/2017 | Story, Jr. | ............... | G06F 3/0484 |
| 9,916,362 B2* | 3/2018 | Parundekar | ........ | G06F 16/24578 |
| 10,002,194 B2* | 6/2018 | Russell | ............. | G06Q 30/0281 |
| 2007/0078884 A1* | 4/2007 | Ott, IV | ................. | G06F 16/951 |
| 2008/0104111 A1* | 5/2008 | Slaney | ................ | G06F 16/9535 |
| 2008/0301118 A1* | 12/2008 | Chien | ................... | G06F 16/954 |
| 2008/0320078 A1* | 12/2008 | Feldman | ............... | H04W 4/021 |
| | | | | 709/203 |
| 2009/0271403 A1* | 10/2009 | Kamimaeda | ........... | G06F 16/435 |
| 2010/0131385 A1* | 5/2010 | Harrang | ............. | G06Q 30/0277 |
| | | | | 705/26.1 |
| 2010/0153324 A1* | 6/2010 | Downs | .................. | G06F 40/258 |
| | | | | 706/21 |
| 2010/0205222 A1* | 8/2010 | Gajdos | .................. | G06F 16/683 |
| | | | | 707/803 |
| 2013/0080371 A1* | 3/2013 | Harber | .................. | G06F 16/686 |
| | | | | 706/50 |
| 2013/0290905 A1* | 10/2013 | LuVogt | .................. | G06N 3/006 |
| | | | | 715/835 |
| 2014/0179441 A1* | 6/2014 | Morrison, III | ..... | H04N 21/4781 |
| | | | | 463/43 |
| 2015/0324356 A1* | 11/2015 | Andres Gutierrez | ........................ | |
| | | | | H04N 21/4532 |
| | | | | 707/734 |
| 2017/0061286 A1* | 3/2017 | Kumar | ............... | G06Q 30/0269 |
| 2017/0104824 A1* | 4/2017 | Bajwa | .................... | H04W 4/44 |
| 2019/0164069 A1* | 5/2019 | Zhivotvorev | ...... | G06Q 30/0631 |

* cited by examiner

COLD-START PODCAST RECOMMENDATIONS

CROSS REFERENCE TO RELATED APPLICATIONS

This application claims the benefit of U.S. Provisional Application No. 62/691,438, filed Jun. 28, 2018, as well as U.S. Provisional Application No. 62/767,464, filed Nov. 14, 2018, the disclosures of which are hereby incorporated by reference herein in their entireties.

TECHNICAL FIELD

The disclosure generally relates to the field of digital content delivery over a network, and more particularly to improving quality of streaming content by providing improved network streaming of content relevant to listeners.

BACKGROUND

Streaming content providers provide content over networks (e.g., the Internet). These streaming content providers provide a wide variety of content, such as music, video, and podcasts. There are difficulties in identifying content that is relevant to a user, particularly when new formats of content are adopted by a streaming content provider. Podcasts are a relatively nascent form of content that have technical qualities that differ from traditional media. For example, many podcasts are user-generated and have minimal metadata populated by the users who generate them. Further, many users simply have not consumed podcasts in the past, and so historical consumption data may not be available to inform a decision on what podcast to stream. Thus, streaming content providers face difficulty in identifying podcasts relevant for streaming.

SUMMARY

Systems and methods are disclosed herein for a content service generating podcast recommendations for a user in a cold start situation where the user has not previously consumed podcasts from the content service. In an embodiment, a content server receives a request for a content recommendation (e.g., a navigation to podcast media from music media within an application provided by the content server). Responsive to receiving the request, the content server determines whether a profile of the user indicates consumption by the user of podcasts. Responsive to determining that the profile does not indicate consumption by the user of podcasts, thus indicating a cold start problem where there is no historical podcast consumption to inform podcast recommendations, the content server generates podcast recommendations based on historical music consumption. For example, the content server determines music preferences of the user based on data of the profile, generates a podcast seed based on the music preferences, and selects a podcast recommendation to the user based on the podcast seed. The seed content comprises a word, phrase, content category (e.g. genre), or content item (e.g., podcast series and/or episode). The content server provides the podcast recommendation to the user. The content server may play back a podcast corresponding to the podcast recommendation responsive to receiving a selection of the podcast recommendation from the user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
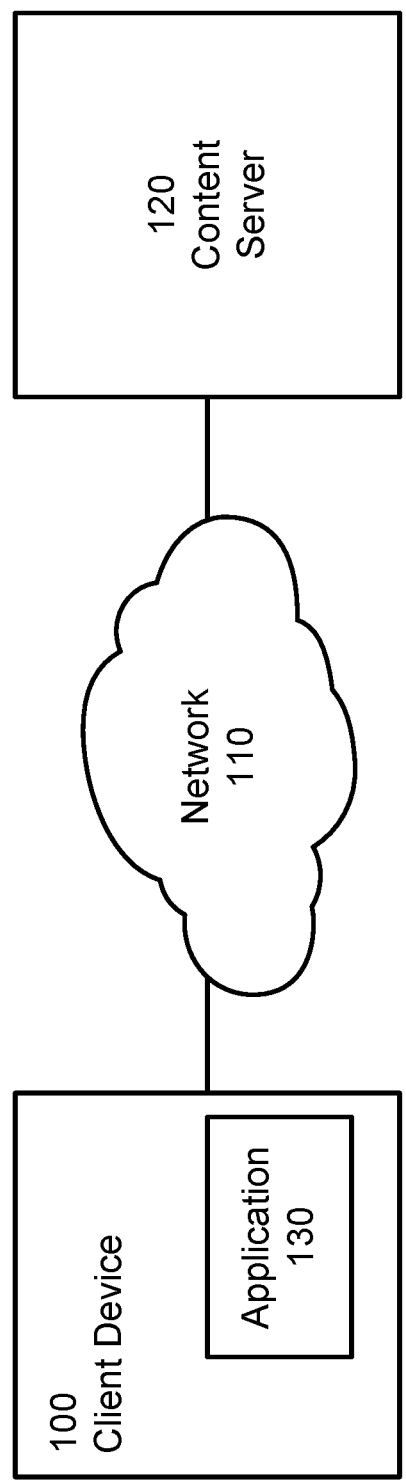
FIG. 1 is a high-level block diagram illustrating an embodiment of an environment for recommending podcasts to listeners, according to one embodiment.

FIG. 1 is a high-level block diagram illustrating an embodiment of an environment for recommending podcasts to listeners. The environment includes a client device 100 connected by a network 110 to a content server 120. Here only one client device 100 and content server 120 are illustrated but there may be multiple instances of each of these entities. For example, there may be thousands or millions of client devices 100 in communication with one or more content servers 120.

The network 110 provides a communication infrastructure between the client devices 100 and the content servers 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The client devices 100 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 100 include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

The client device 100 includes an application 130 that allows interaction with the content server 120. For example, the application 130 could be a browser that allows a user of the client device 100 to obtain content by browsing a web site of the content server 120. As another example, the application 130 could be a dedicated application specifically designed (e.g., by the organization responsible for the content server 120) to enable interactions with the content server 120 and its content. In an embodiment, client device 100 requests content be streamed from content server 120 by way of the web site of the content server 120 or the application 130.

The application 130 presents content items to users of the client devices 100. In one embodiment referred to throughout the remainder of the specification, the content item is an audio podcast. Therefore, the users are referred to as "listeners." It is appreciated, however, that in other embodiments a content item alternatively and/or additionally includes other forms of digital content, such as video and music. The application 130 requests or otherwise receives particular podcasts from the content server 120. Content items can be received by way of streaming or downloading from content server 120.

The content server 120 streams podcasts to listeners, and provides recommendations for podcasts. The recommendations can include those for particular series (i.e., collections of episodes forming a podcast) and for particular episodes. The recommendations may be based on information about the podcasts and information about the listeners. In one embodiment, the recommendations are determined at least in part on podcast genomes. A genome is a data structure including annotations for a content item (such as a podcast series or episode), where each annotation maps the podcast to one or more particular attributes of the podcast. Genome-based recommendations are particularly beneficial in cold start situations in which little is known about a user's podcast preferences. In such cold start situations, the recommendations may be determined by mapping genomes of music that a user prefers to podcast genomes, by inferring relationships between the music genome and the podcast genome. Making recommendations in this manner improves the operation of the content server 120 relative to other content servers by making it easier for listeners to find relevant and interesting podcast content.

Figure 2:
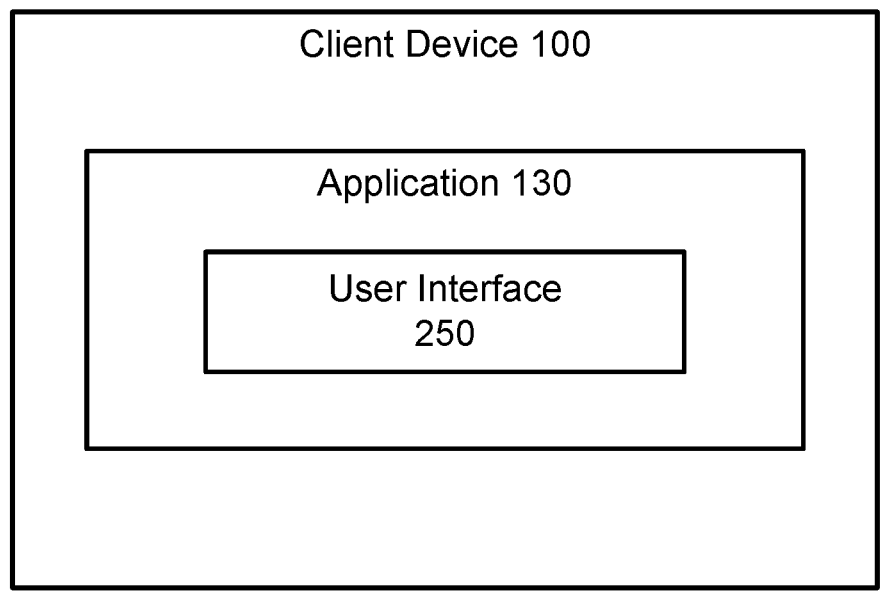
FIG. 2 is a high-level block diagram illustrating a detailed view of a client device, according to one embodiment.

The client device 100 and content server 120 are now described in more detail with respect to FIGS. 2-4, below. FIG. 2 is a high-level block diagram illustrating a detailed view of a client device 100 of FIG. 1, according to one embodiment. The client device 100 includes an application 130 specifically designed to operate with the content server 120. For example, in one embodiment the application includes a user interface 250 for interacting with the content server 120. The user interface 250 allows the listener to view available podcasts and recommended podcasts and select one or more podcasts for listening. The user interface 250 also includes a description area providing information on a currently-playing podcast and controls playback of a given podcast. The user interface 250, in an embodiment, also allows the listener to view available music, and provide various feedback and actions with respect to music.

Figure 3:
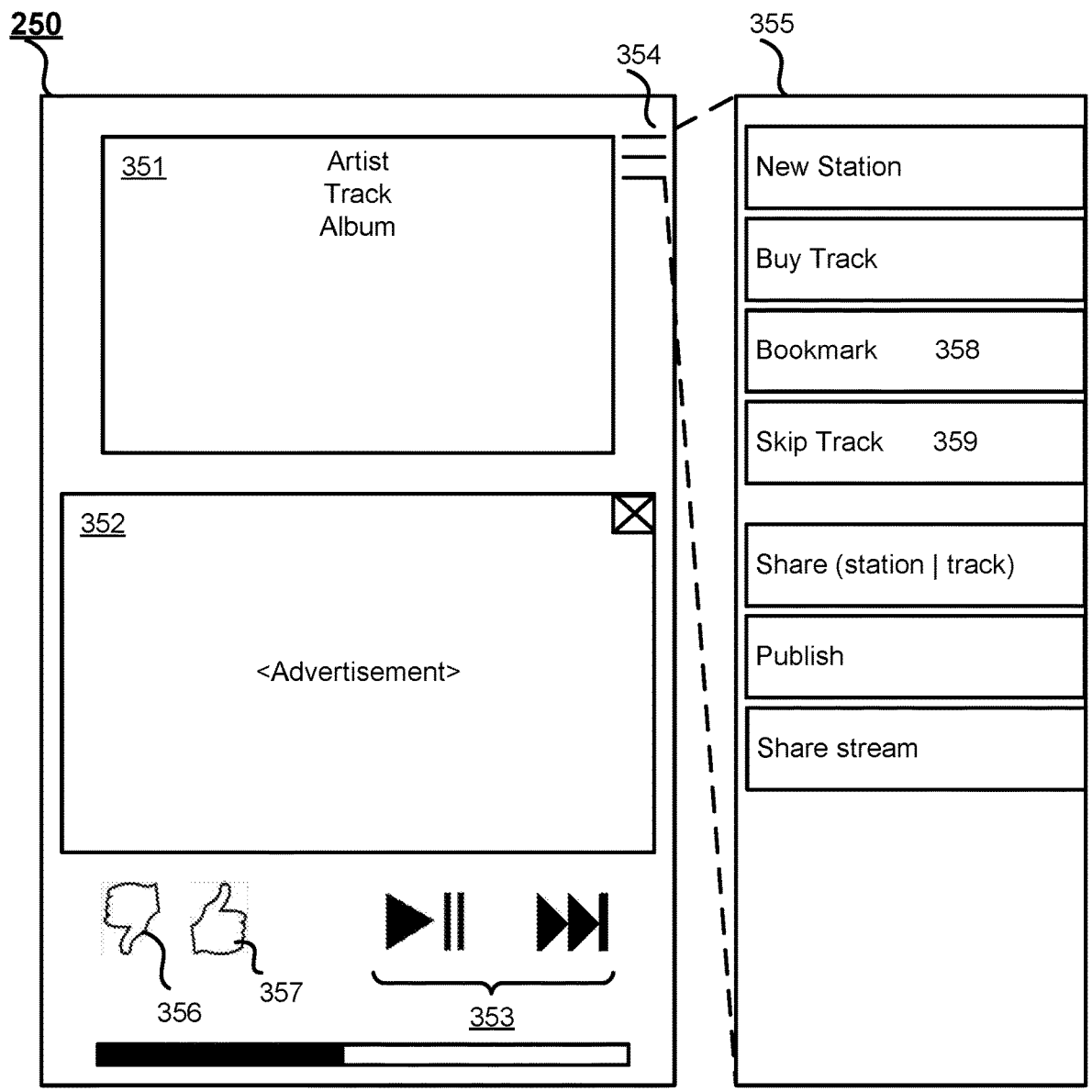
FIG. 3 is a high-level block diagram illustrating an exemplary user interface of an application running on a client device, according to one embodiment.

For example, in one embodiment, the application includes a user interface 250 for interacting with content items streamed from content server 120, as illustrated in FIG. 3. The example user interface 250 includes a description area

351 providing information on a currently-playing content item, an optional image advertisement 352, controls 353 to pause/play or skip the currently playing content item. The example user interface 250 also includes a set of options 355 (shown in response to selection of popup control 354) that include an option to request a content item associated with a particular artist, genre, or the like. In addition to controls 353 for controlling the stream the user may also provide direct negative feedback regarding the content item currently playing by selecting the negative feedback icon 356. Alternatively, the user may provide direct positive feedback by selecting the positive feedback icon 357. The user may also provide indirect feedback by taking other actions on the stream that may be indicative of the user's sentiment towards the content item currently streaming but are not explicit indications of user sentiment. Some of these actions include but are not limited to bookmarking a content item for later reference by selecting the bookmark option 358 and skipping the content item by selecting the skip track option 259 or using the skip song button in the controls 353. In some embodiments, the act of leaving the stream altogether provides an instance of additional indirect feedback. The feedback may be transmitted to content server 120 for storage in a user profile. These instances of direct and indirect feedback may be stored to a database and used to determine preferences of users for the purpose of making cold start recommendations for podcasts, as will be described with respect to FIG. 3 below.

Figure 4:
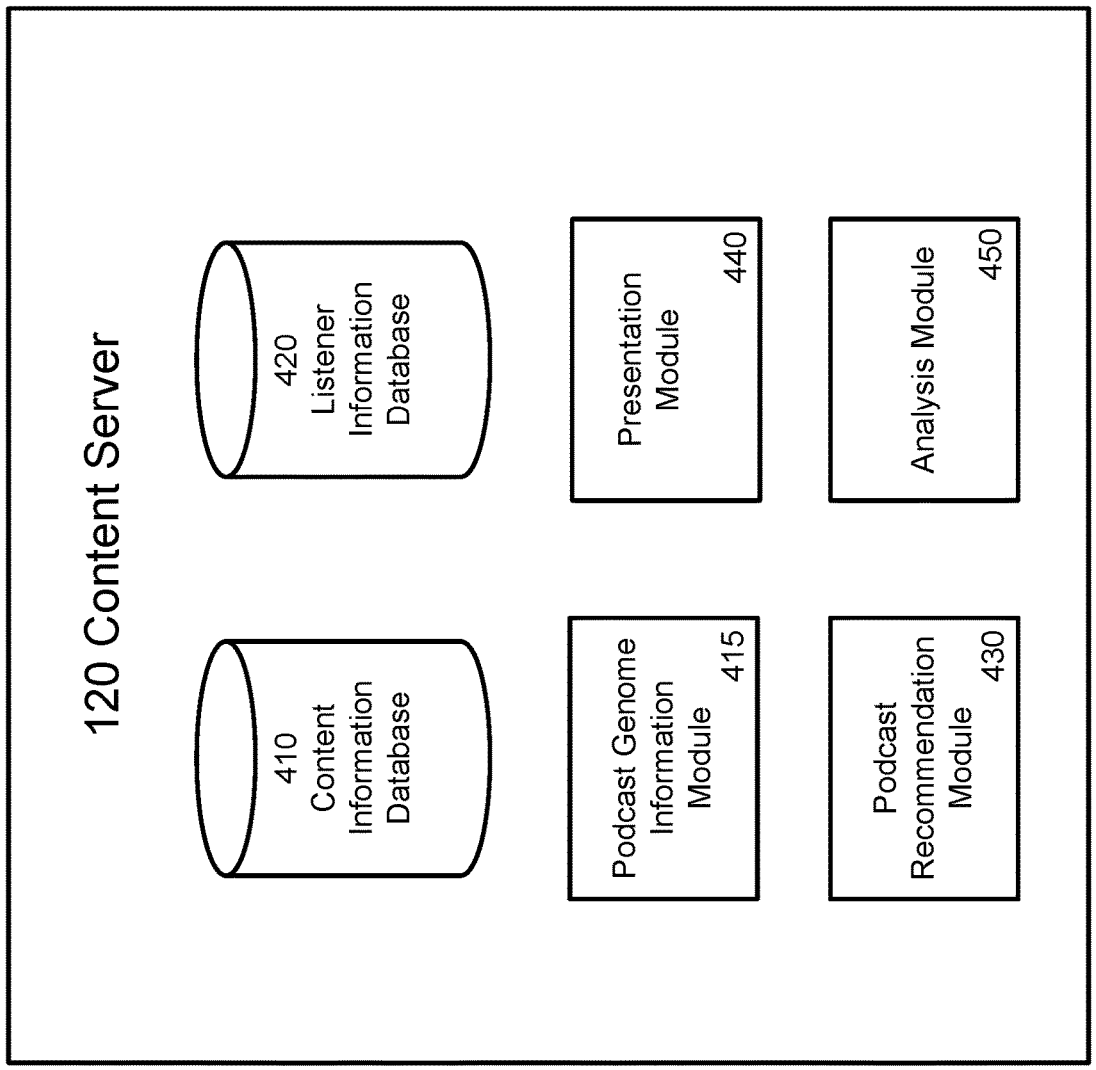
FIG. 4 is a high-level block diagram illustrating a detailed view of a content server, according to one embodiment.

Turning now to a discussion of the structure of the content server 120, FIG. 4 is a high-level block diagram illustrating a detailed view of modules within the content server 120 according to one embodiment. Some embodiments of the content server 120 have different modules than those described here. Similarly, the functions can be distributed among the modules in a different manner than is described here.

A content information database 410 stores information about content items, including information about podcast series and individual episodes of the podcast series. A podcast series is a collection of related podcasts, such as a series of episodes by a same host or relating to a same topic. This information includes genomes. The genome is a schema for describing a content item. The schema describes a set of annotations, with each annotation storing a value describing a particular property of the content item. The annotations include a category containing a value selected from a semantic hierarchy. Semantic hierarchies may differ between different types of content items. For example, a song's semantic hierarchy may include annotations relating to song type, tempo, and instrumental qualities, whereas a podcast's semantic hierarchy may include annotations relating to types that are inapposite to song types, such as news, sports, and politics, a host/cast profile, maturity level, podcast style, audience profile, episode entities, and episode topics. An annotation can have a magnitude indicating the strength of the value of the annotation to the content item. The genome for a content item can be represented as a feature vector containing an ordered list of attributes.

The content item genome information in the database 410 can be established using manual and/or automated techniques. At least some information in the genome may be supplied by publishers of the podcasts. For example, the publishers may provide metadata describing content items, and the metadata may be used as genomic attributes.

In one embodiment, genome information for podcasts is established using machine-learned information. Podcast genome information module 415 may generate the genome information by applying a speech-to-text algorithm is to spoken content within an episode of a podcast to produce a transcript of the episode. Podcast genome information module 415 may apply entity recognition to the transcript in order to recognize entities mentioned in the episode. Podcast genome information module 415 may store the entity information in the content information database 410 as episode entities in the genome for the episode. In addition, podcast genome information module 415 may access a knowledge graph to obtain characteristics of the recognized entities. The knowledge graph describes a network of entities, the entities' semantic types and properties, and the relationships between the entities. These characteristics are stored in the content information database 410 as episode topics. For example, if the podcast episode mentions "orchids," this entity would be recognized and stored as an episode entity. The knowledge graph is accessed to learn that an orchid is a plant and flower, and "(plant, flower)" is stored as an episode topic in the genome for that podcast by genome information module 415. Together, the established information forms a podcast genome.

Other annotations in the podcast genome can be determined using similar techniques. In one embodiment, podcast genome information module 415 employs a machine-learned classifier that is trained to determine categories of podcasts based on entities or other content found in the transcripts. For example, if the transcript for a podcast episode frequently uses the word "president," the classifier might assign the category genome annotation the value "politics," and podcast genome information module 415 may store the value "politics" to the podcast genome for that episode.

In addition, podcast genome information module 415 may derive the annotations for a podcast series from the annotations of the individual episodes of the podcast series. Podcast genome information module 415 may combine the annotations of the individual episodes to produce the corresponding annotation for the podcast series. Podcast genome information module 415 may perform this combination by referencing the knowledge graph to identify commonalities in the episode annotations, and then assigning an annotation value to the series that encompasses the commonalities. For example, if the episode topics for multiple episodes include different types of flowers (e.g., iris, lily, orchids), the knowledge graph can be used by podcast genome information module 415 to recognize that these entities are all flowers (e.g., by recognizing that all of the entities descend from the same parent "flowers" node in the knowledge graph). Then, podcast genome information module 415 may generate a topic annotation for the podcast series that includes the value "flowers." Further, podcast genome information module 415 may generate an annotation for each podcast of a series indicating an episode number in the series, and may generate an annotation for the full series indicating whether some or all episodes are intended to be played back in sequence.

A listener information database 420 stores information about listeners. The listener information includes demographic information, taste information, associated messaging segments, social networking information, and interaction information. The demographic information describes the users' attributes with respect to a set of demographic categories, such as age and gender. The taste information describes the users' preferences for content items (e.g., podcasts, songs), expressed in terms of strength of association between a given listener and particular values of attributes in the content item genome. The taste information, and user preferences generally, may be stored in distinct user profiles, each corresponding to a different user. The messaging segments describe messaging categories into which the listeners belong, such as advertising segments. For example, messaging segments may indicate a life stage of a listener, a geography associated with the listener, whether the listener is a sports fan, etc. A given listener can belong to one or more messaging segments. The messaging segments have descriptive textual labels, such as "active console gamers" and "post college." The social networking information describes social networking activities of listeners, such as podcasts, celebrities, and topics followed by the listeners. The interaction information describes the listeners' interactions with previously-presented content items, such as whether the listener completed, thumbed, rewound, fast-forwarded, skipped, and/or paused the content items. Some types of listener information may be absent for certain users. For example, some listeners may decline to provide social networking information. Further, listeners who are new to the content server 120 may lack taste and/or interaction information for one or more content items (e.g., taste and/or interaction information may be present for songs, but not for podcasts).

A podcast recommendation module 430 recommends podcasts to listeners based at least in part on the content information and the listener information. Podcast recommendation module 430 provides podcast recommendations in cold start situations, where users have little or no history of streaming podcasts from content server 120. Recommendations can be made for both podcast series and individual episodes. In one embodiment, the podcast recommendation module 430 makes recommendations using one or more different techniques, including content-based, collaborative, and collective intelligence-based techniques. When the podcast recommendation module 430 uses multiple recommendation techniques, it combines the results of the different recommendation techniques to produce the set of podcast recommendations for the listener. An exemplary technique is accessing a user's profile to determine music preferences, and deriving podcast recommendations based on the music preferences. The manners in which the podcast recommendation module 430 generates and outputs recommendations is described in further detail below with respect to FIG. 5.

A presentation module 440 presents podcast recommendations to listeners. In one embodiment, the presentation module 440 identifies when to present podcast recommendations to a listener, interacts with the recommendation module 430 to obtain the recommendations, and then presents the obtained recommendations to the listener. For example, the presentation module 440 can present the recommendations in the form of a ranked list containing a mix of podcasts, where the more highly-recommended podcasts are ranked higher.

The presentation module 440 can present podcast recommendations in a variety of different contexts. One such context is when a listener is browsing a "my content" page provided by the content server 120. This page may include a region showing podcast recommendations to the listener. For this browsing context, there is typically not a seed because there is no particular podcast that serving as a focal point for generating the recommendations. Therefore, the recommendations received from the recommendation module 330 in the browsing context are primarily based on content information for candidate podcasts and listener information for the particular listener.

The presentation module 440 can also present podcast recommendations in a "podcast details," or "backstage,"

context. Here, the listener selects a link presented by the content server 120 to view a backstage page providing more information about a particular podcast. For example, the listener can select a particular series or episode presented in a list of recommended podcasts (e.g., a podcast playlist, as described with respect to FIG. 5 below). The presentation module 440 presents podcasts recommendations on the backstage page. These recommendations are based at least in part on the podcast associated with the backstage page. The recommendations received from the recommendation module 430 in the backstage context use the podcast associated with the backstage page as a seed, and are also based on content information for candidate podcasts and listener information for the particular listener.

Autoplay is another context in which the presentation module 440 presents podcast recommendations based at least in part on a podcast seed (to be described below with reference to FIG. 5. Autoplay is a feature provided by the content server 120 that automatically plays a subsequent podcast episode after a prior podcast episode. If the user has not specified a podcast to play next (e.g., via a playlist containing a queue of podcasts), the presentation module 440 accesses the recommendation module 330 to obtain a set of recommended podcast episodes using the genome of the prior podcast as a seed. The podcast recommendation module 430 returns a rank list of recommended podcast episodes, and the presentation module 440 selects an episode from the list and plays it after the prior podcast. For example, the presentation module 440 may automatically play the highest-ranked podcast episode returned by the podcast recommendation module 430.

The presentation module 440 also presents recommended podcasts in the search context. This context arises when a listener submits a search query containing one or more search terms. The query could be submitted for example by keyboard or voice. In this context the presentation module 440 provides the search terms to the podcast recommendation module 430 to obtain a set of recommended podcasts based at least in part on the search terms. The presentation module 440 presents the recommended podcasts to the listener as search results in response to the query.

An analysis module 450 provides reports resulting from analyses of the content information 310 and/or listener information 320. The analysis module 450 collects information describing usage of the content server 120, including what podcasts were recommended to what listeners, and how the listeners reacted to the recommendations. The analysis module 450 uses the content information including the genomes, the listener information, and the podcast transcripts to generate metrics describing what content within the podcasts is being consumed by different listeners. These metrics provide detailed insights into what types of listeners are listening to what types of podcasts. The metrics may be fed back to podcast recommendation module 430, for example, to improve recommendations, improve other aspects of the content server 120, and to inform marketing strategies for the content server and/or podcasts.

Figure 5:
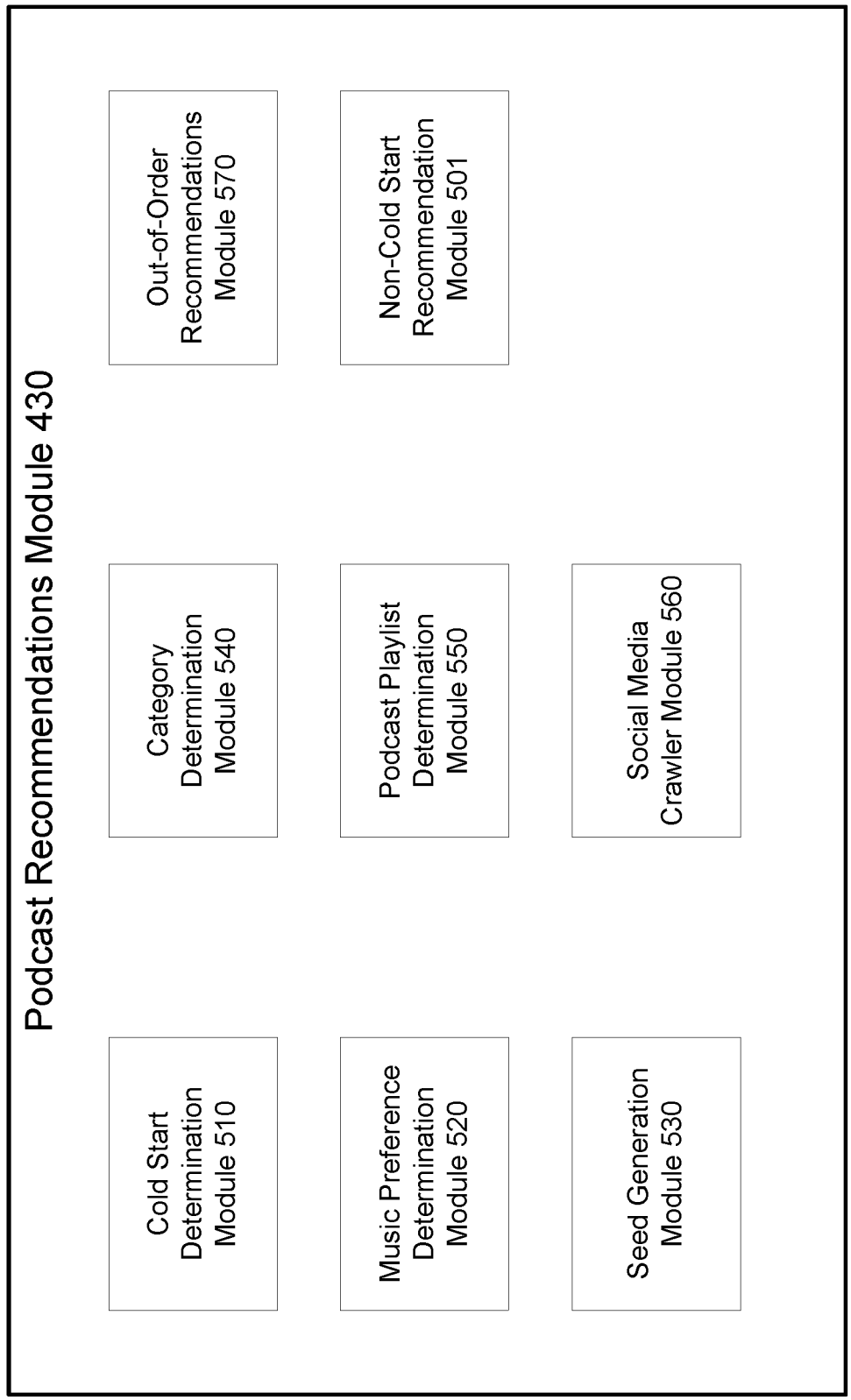
FIG. 5 is a high-level block diagram illustrating a detailed view of a podcast recommendation module, according to one embodiment.

FIG. 5 is a high-level block diagram illustrating a detailed view of the podcast recommendation module 430, according to one embodiment. Fewer, or more, sub-modules than depicted may be implemented in podcast recommendation module 430. The podcast recommendation module 430 includes a cold start determination module 510. The cold start determination module 510 accesses listener information database 420 to determine, from a profile of the user, whether the user has historically consumed podcasts from the content server 120. As used herein, the determination of whether a user historically consumed podcasts may turn on whether the user has consumed any podcasts from content server 120. In an embodiment, the determination of whether the user historically consumed podcasts may turn on whether the user has consumed less than a threshold amount of podcasts, or has listened to podcasts for less than a threshold amount of time. Such thresholds may be set by an administrator of the content server 120.

Where the user has historically consumed podcasts from content server 120, the podcast recommendation module 430, cold start recommendations are not needed, and instead the historical consumption can be used to generate recommendations. Thus, in this case, the podcast recommendation module 430 calls on the non-cold start recommendation module 501 for generating podcast recommendations. In an embodiment, in response to determining that the user has historically consumed podcasts from content server 120, the podcast recommendation module 430 may command listener information database 420 to add a flag to the profile of the user, the flag commanding podcast recommendation module 430 to directly execute the non-cold start recommendation module 501 responsive to future navigations of the user to a podcast menu using user interface 250, without executing cold start determination module 510.

Where the user has not historically consumed podcasts from content server 120, the podcast recommendation module 430 generates podcast recommendations based on taste and interaction information learned from the user's interactions with songs, as indicated in the user profile, and as described above with respect to FIGS. 2 and 3. Because the user has not listened to podcasts, and has thus only listened to music streamed from content server 120, the taste and interaction information collectively form music preferences.

Music preference determination module 520 retrieves the music preferences of the user from the user's profile stored in listener database 420.

Seed generation module 530 analyzes the music preferences to generate a podcast seed. The term seed, as used herein, may refer to a generic representation of interest of the user. The seed is made up of one or more content item genomes. The term podcast seed, as used herein, may refer to a seed that is a representation of podcast attributes that are of interest to the user. In an embodiment, seed generation module 530 generates a podcast seed by mapping one or more music genomes to a podcast space. Seed generation module 530 performs the mapping by comparing music genomes that match the music preferences to entries of a knowledge graph that map attributes of those genomes to podcast attributes. For example, the knowledge graph may indicate that a music attribute of "Gospel Music" maps to a podcast attribute of "Christian." While some music attributes may not map directly to podcast attributes (e.g., "gospel music" is not a quality that a podcast can have, as a podcast is not a song), other song attributes will map directly to podcast attributes (e.g., "Christian," which is a topic that may describe Christian music, or Christian podcast lecture topics). Seed generation module 530 generates the podcast seed using one or more podcast genomes that match the mapping. In an embodiment, seed generation module 530 may adopt attributes of a podcast genome as the podcast seed (e.g., where a user indicates that he would like recommendations for podcasts similar to a particular podcast).

Category determination module 540 may determine a category of song reflected by the music preferences by retrieving the category from a genome matching the song from content database 410. Category determination module 540 may determine a category of a podcast that matches the category of the song, and may feed the category back to seed generation module 530 to use the category in the seed. As a specific example, category determination module 540 may infer from associations in the knowledge graph that "Gospel Music" is in the category "Christian." Category determination module 540 is merely illustrative; podcast recommendation module 430 may include attribute determination modules for attributes other than category.

Seed generation module 530 may include in the seed a prominent attribute of the music preferences of a user. The term prominent attribute, as used herein, refers to an attribute of the music preferences that is featured, relative to other songs that the user plays back, in a high number of songs that the user plays back. Seed generation module 530 may determine an attribute to be a prominent attribute by determining that a threshold amount or percentage of songs feature the attribute. Seed generation module 530 may then access the knowledge graph to map the prominent attribute to a podcast attribute. For example, the knowledge graph may indicate a high strength of association between high tempo songs and podcasts that are of a "Thriller" category, based on a high percentage of users who prefer high tempo songs also preferring "Thriller" podcasts. Seed generation module 530 includes the resulting podcast attribute in the podcast seed.

In an embodiment, seed generation module 530 may generate a seed in part by activities of users beyond that of the user for whom the recommendation is being generated. Seed generation module 530 may determine from the music preferences that the user enjoys songs having a particular attribute. For example, seed generation module 530 may determine that the user enjoys songs by the artist "Marilyn Manson." Seed generation module 530 may determine from the knowledge graph that a threshold percentage of users who enjoy songs having a particular attribute enjoy a particular podcast attribute, or a particular podcast episode. For example, seed generation module 530 may consult the knowledge graph and may determine that a threshold percentage of users that enjoy songs by the artist "Marilyn Manson" enjoy podcasts of a "horror" genre, or a particular podcast entitled "Creepy Horror." The threshold may be an arbitrary number established by an administrator of content server 120 (e.g., 30%). Seed generation module 530 may include the particular podcast attribute, or attributes of the particular podcast episode, in the podcast seed.

Podcast playlist determination module 550 determines a playlist corresponding to the podcast seed. Podcast playlist determination module 550 identifies podcasts having similar attributes to the podcast seed by retrieving genome data from content database 410 to identify other podcasts that share attributes of the podcast seed. Podcast playlist determination module 550 may rank the identified podcasts based on an amount of attributes that are shared, where a higher number of shared attributes results in a higher ranking. Podcast playlist determination module 530 may use the highest ranking podcasts to form the playlist. The ranking may be weighted based on the music preferences reflecting a preferred attribute (e.g., a prominent attribute, as described above).

Podcast playlist determination module 550 may use social media data to determine podcasts having similar attributes to a podcast on the playlist (e.g., using data fed back to podcast playlist determination module 550 from social media crawler 560). Social media crawler 560 may access genome data corresponding to the podcast on the playlist from content information database 410, and may pull therefrom an identifier of the podcast, such as a podcast title, a host of the podcast, and the like. Social media crawler 560 may identify a social media page based on the identifier (e.g., a show page, or a social media profile of the host). Social media crawler 560 then identifies a plurality of users who subscribe to the social media page. For example, social media crawler may access the social media page, which may indicate users who are followers or subscribers of that social media page. Social media crawler 560 searches a provider of the social media page for another social media page corresponding to another podcast to which a threshold percentage of the plurality of users also subscribe. For example, an administrator of content server 120 may assign the threshold percentage to be 15%. If at least 15% of the subscribers of the social media page also subscribe to another social media page for another podcast (or for another host of another podcast), social media crawler module 560 may inform podcast playlist determination module 550, which may determine on the basis of a threshold number of subscribers subscribing to both social media pages that the podcast corresponding to the additional social media page is similar to the seed podcast, and may add the another podcast to the list of recommendations (e.g., playlist).

Podcast playlist determination module 550 may identify, for addition to the playlist, episodes of a series that, if recommended to the user, would cause the user to consume later episodes in the series where earlier episodes in the series have not yet been consumed by the user. Podcast playlist determination module 550 may determine that an identified episode qualifies where the user profile reflects that episodes of a series prior to the identified episode have not been consumed by the user. There are scenarios where this will not materially impact the user experience, such as scenarios where a series does not have a plot line that connects each episode of the series. There are also scenarios where this will materially impact the user experience, such as scenarios where a series does have a plot line that connects each episode of the series, where the user may be confused consuming (e.g., listening to) a later episode before consuming earlier episodes that provide plot context. Podcast playlist determination module 550 determines whether to add the identified episode to the playlist based on feedback received from out-of-order recommendation module 570.

In an embodiment, podcast recommendation module 430 identifies an entire series as candidates for recommendation. Out-of-order recommendation module 570 may determine an episode of the series, relative to other episodes of the series, that most closely matches the podcast seed. Out-of-order recommendation module 570 may perform this determination by comparing attributes of each episode of the series to the attributes of the podcast seed, and identifying the episode with the most matching attributes. For example, if the seed includes an attribute of "Puppies," a series about dogs may generally surface as having episodes that are candidates for recommendations because dogs relate to puppies, but a particular episode about puppies will match more closely than the other episodes. In a related embodiment, rather than identifying the entire series as candidates for recommendation, out-of-order recommendation module 570 simply identifies the episode about puppies as a candidate based on attributes of the genome of the episode reflecting a topic of "puppies," and identifies that the episode about puppies is later in the series than the first episode in the series based on information from content database 410 indicating an episode number of a series. Out-of-order recommendation module 570 may, in either embodiment, reference the user profile to determine whether the user would be consuming the episode out-of-order, based on whether the user profile reflects whether the user consumed earlier episodes in the series already.

Where the user has not viewed earlier episodes in the series, out-of-order recommendation module 570 may determine whether to nonetheless recommend the candidate episode out-of-order. For example, out-of-order recommendation module 570 may retrieve information from content information database 410 that indicates whether the candidate episode is labeled for sequential playback. Such information may be an express label that sequential playback should be followed, or may be another label that the knowledge graph indicates is associated with a benefit to sequential playback. In an embodiment, out-of-order recommendation module 570 may consult the knowledge graph to determine a strength of association with playing the candidate episode in order, or out-of-order, based on historical consumption habits with respect to the candidate episode of other users.

Where out-of-order recommendation module 570 determines that the candidate episode is not labeled for sequential playback, out-of-order recommendation module 570 may instruct podcast recommendation module 430 to output a recommendation for the candidate episode. Where out-of-order recommendation module 570, however, determines that the candidate episode is labeled for sequential playback, out-of-order recommendation module 570 may instruct podcast recommendation module 430 to output a recommendation for the first episode of the series (or a next episode in the series that has not yet been consumed by the user). In an embodiment, when recommending an earlier episode of the series, podcast recommendation module 430 may include in the recommendation an indication of the candidate episode as a reason for which the podcast recommendation is being made. For example, the indication may note that while a series is generally about animals, episode three of the series is about puppies, which is why the series is likely to be interesting to the user.

As was described above, in non-cold start scenarios, podcast recommendation module 430 executes non-cold start recommendation module 501 to generate recommendations. In such embodiments, non-cold start recommendation module 501 makes content-based recommendations based on similarity between content information (e.g., podcast genomes) about candidate podcasts and information describing listener preferences. The content-based recommendations may be supplemented based on historical consumption of other content items, such as music. In one embodiment, the content-based recommendations are based at least in part on similarity between the content information and seed content. The seed content comprises a word, phrase, content category (e.g., genre) or content item (e.g., podcast series and/or episode). A seed may be received from a listener as a free-form text input, e.g., as a written or spoken search term. Upon receiving a textual seed, the podcast recommendation module 430 compares the seed with content information describing candidate podcasts in order to identify podcasts related to the seed. The recommendation module 330 may use the knowledge graph to gain information about a textual input seed. For example, if the seed is "orchid" the recommendation module 330 may access the knowledge graph to ascertain that an orchid is a type of flower, and then compare the term "flower" with content information describing candidate podcasts in order to identify podcasts related to flowers. Upon receiving a content item as a seed, the recommendation module 430 compares content information associated with the seed content item with the content information of candidate podcasts in order to identify candidates similar to the seed. Seed content may be used in cold start scenarios as well, where recommendations and playlists are influenced by receipt of a seed from a user.

Figure 6:
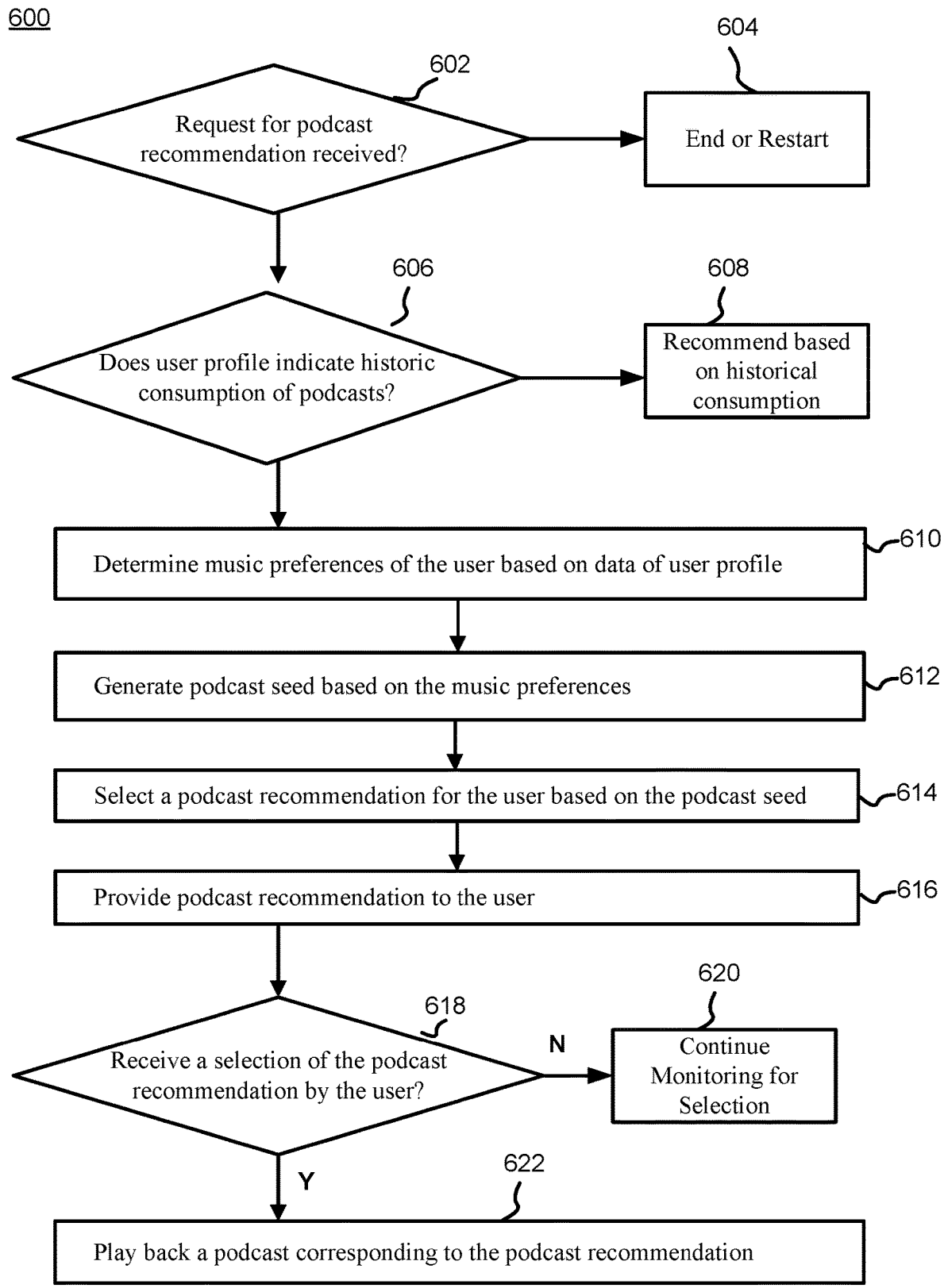
FIG. 6 is a flowchart illustrating an exemplary process for providing podcast recommendations, according to one embodiment.

FIG. 6 is a flowchart illustrating an exemplary process for providing podcast recommendations, according to one embodiment. Process 600 begins with podcast recommendation module 430 of content server 120 receiving 602 a request for a podcast recommendation, such as a navigation command being detected to navigate to a podcast menu. Where no request is detected, podcast recommendation module 430 either continues monitoring 604 for a request, or ends process 600. Where a request is detected, podcast recommendation module 430 determines 606 whether the profile of the user (e.g., as retrieved from listener information database 420) indicates consumption by the user of podcasts (e.g., by executing cold start determination module 510). Responsive to determining that there has been historical consumption by the user of podcasts from content server 120, podcast recommendation module 430 executes non-cold start recommendation module 501 to recommend 608 podcasts based on historical consumption. Responsive to determining that there has not been historical consumption by the user of podcasts from content server 120, podcast recommendation module 430 determines 610 music preferences of the user based on data of the user's profile by executing music preference determination module 520.

Podcast recommendation module 430 uses the music preferences to generate 612 a podcast seed by executing seed generation module 530. Podcast recommendation module 430 then selects 614 a podcast recommendation for the user based on the podcast seed (e.g., by recommending a podcast from a playlist generated using podcast playlist determination module 550), and provides 616 the podcast recommendation (e.g., using user interface 250). Content server 120 may subsequently receive 618 a selection of the podcast recommendation from the user, and responsively play back 622 a podcast corresponding to the podcast recommendation (or may continue monitoring 620 for a selection of the podcast recommendation where no selection has yet been received). Alternatively, content server 120 may automatically play back a first podcast of the playlist, without displaying the recommendation, and/or requiring selection of the recommendation.

Figure 7:
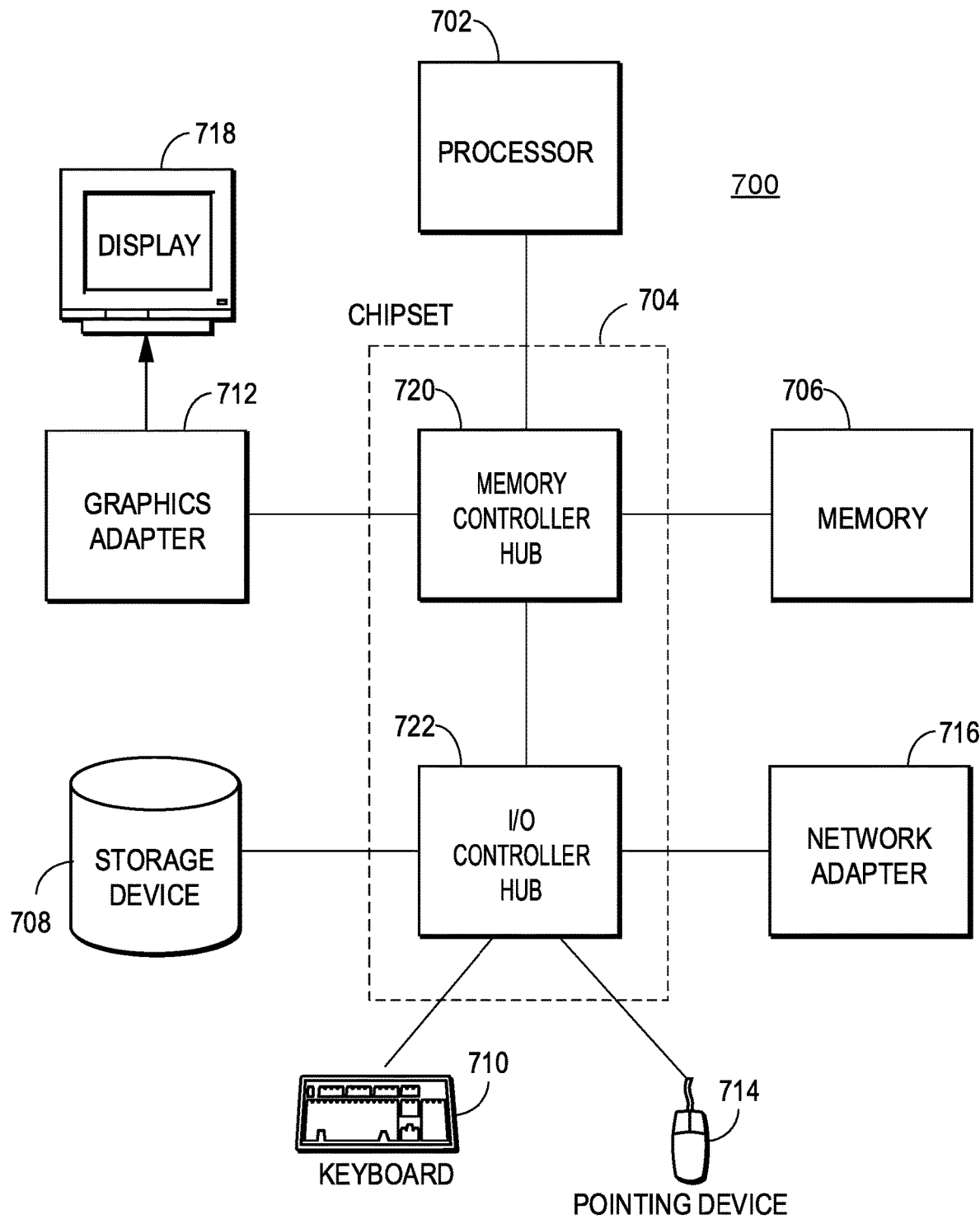
FIG. 7 is a high-level block diagram illustrating physical components of a computer used as part or all of a content server system or client device, according to one embodiment.

Turning now to a discussion of the implementation of client device 100 and/or the content server 120, FIG. 7 is a high-level block diagram illustrating an example computer 700 for implementing the entities shown in FIG. 1. The computer 700 includes at least one processor 702 coupled to a chipset 704. The chipset 704 includes a memory controller hub 420 and an input/output (I/O) controller hub 722. A memory 706 and a graphics adapter 712 are coupled to the memory controller hub 720, and a display 718 is coupled to the graphics adapter 712. A storage device 708, an input device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information on the display 718. The network adapter 716 couples the computer 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used by the entities of FIG. 1 can vary depending upon the embodiment and the processing power required by the entity. For example, the content server 120 can run in a single computer 700 or multiple computers 700 communicating with each other through a network such as in a server farm. The computers 700 can lack some of the components described above, such as graphics adapters 712, and displays 718.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

Additional information about how the content server 120 provides recommendations of podcasts to listeners are found in the attached documents.

What is claimed is:

1. A method for providing podcast recommendations, the method comprising:
   receiving a request for a podcast recommendation;
   determining whether a profile of the user indicates consumption by the user of podcasts;
   responsive to determining that the profile does not indicate consumption by the user of podcasts:
      determining music preferences of the user based on data of the profile;
      generating a podcast seed based on the music preferences by:
         determining a prominent attribute of the music preferences, the prominent attribute being an artist attribute;
         accessing a knowledge graph that maps attributes of the music preferences of users to podcast references;
         identifying, from the knowledge graph, a podcast preference that is mapped to the prominent attribute, the podcast preference reflecting a podcast that is played back by above a threshold percentage of users that prefer the artist; and
         updating the podcast seed to include the podcast preference as an attribute of the podcast seed;
      selecting a podcast recommendation for the user based on the podcast seed, the selected podcast recommendation being for the podcast reflected by the podcast preference; and
      providing the podcast recommendation to the user;
   receiving a selection of the podcast recommendation by the user; and
   responsive to receiving the selection, playing back a podcast corresponding to the podcast recommendation.

2. The method of claim 1, wherein generating the podcast seed based on the music preferences comprises:
   determining a category of music that is preferred by the user based on the music preferences; and
   updating the podcast seed to include the category as an attribute of the seed.

3. The method of claim 1, wherein selecting the podcast recommendation for the user based on the podcast seed comprises:
    identifying a series of podcasts;
    determining an episode of the series that, relative to other episodes of the series, most closely matches the podcast seed; and
    selecting the episode as the podcast recommendation.

4. The method of claim 3, wherein the episode is later in the series than a first episode of the series.

5. The method of claim 4, wherein selecting the episode of the podcast recommendation comprises:
    determining whether the episodes are labeled for sequential playback;
    responsive to determining that the episodes are not labeled for sequential playback, selecting the episode as the podcast recommendation; and
    responsive to determining that the episodes are labeled for sequential playback, selecting the first episode as the podcast recommendation.

6. The method of claim 5, wherein the first episode is selected as the podcast recommendation, and wherein providing the podcast recommendation to the user comprises including, with the podcast recommendation, an indication of the episode as a reason for which the podcast recommendation is being made.

7. A method for providing podcast recommendations, the method comprising:
    receiving a request for a podcast recommendation;
    determining whether a profile of the user indicates consumption by the user of podcasts;
    responsive to determining that the profile does not indicate consumption by the user of podcasts:
        determining music preferences of the user based on data of the profile;
        generating a podcast seed based on the music preferences;
        selecting a podcast recommendation for the user based on the podcast by:
            identifying a podcast that has attributes corresponding to the podcast seed;
            identifying a plurality of similar podcasts to the identified podcast by:
                identifying a social media page corresponding to the identified podcast;
                identifying a plurality of users who subscribe to the social media page;
                searching a provider of the social media page for another social media page corresponding to another podcast to which a threshold percentage of the plurality of users also subscribe; and
                responsive to locating, from the searching, the another social media page, adding the another podcast to the plurality of similar podcasts; and
            generating a playlist including the plurality of similar podcasts; and
    providing the podcast recommendation to the user;
    receiving a selection of the podcast recommendation by the user; and
    responsive to receiving the selection, playing back a podcast corresponding to the podcast recommendation.

8. A non-transitory computer readable medium configured to store instructions, the instructions when executed by a processor cause the processor to perform operations, the instructions comprising instructions to:
    receive a request for a podcast recommendation;
    determine whether a profile of the user indicates consumption by the user of podcasts;
    responsive to determining that the profile does not indicate consumption by the user of podcasts:
        determine music preferences of the user based on data of the profile;
        generate a podcast seed based on the music preferences;
        select a podcast recommendation for the user based on the podcast seed by:
            identifying a series of podcasts;
            determining an episode of the series that, relative to other episodes of the series, most closely matches the podcast seed, wherein the episode is later in the series than a first episode of the series; and
            selecting the episode as the podcast recommendation by:
                determining whether the episodes are labeled for sequential playback;
                responsive to determining that the episodes are not labeled for sequential playback, selecting the episode as the podcast recommendation; and
                responsive to determining that the episodes are labeled for sequential playback, selecting the first episode as the podcast recommendation; and
        provide the podcast recommendation to the user;
    receive a selection of the podcast recommendation by the user; and
    responsive to receiving the selection, playing back a podcast corresponding to the podcast recommendation.

9. The non-transitory computer readable medium of claim 8, wherein the instructions to generate the podcast seed based on the music preferences comprise instructions to:
    determine a category of music that is preferred by the user based on the music preferences; and
    update the podcast seed to include the category as an attribute of the seed.

10. The non-transitory computer readable medium of claim 8, wherein the instructions to generate the podcast seed based on the music preferences comprise instructions to:
    determine a prominent attribute of the music preferences;
    access a knowledge graph that maps attributes of the music preferences of users to podcast preferences;
    identify, from the knowledge graph, a podcast preference that is mapped to the prominent attribute; and
    update the podcast seed to include the podcast preference as an attribute of the podcast seed.

11. The non-transitory computer readable medium of claim 10, wherein the prominent attribute is an artist, wherein the podcast preference reflects a podcast that is played back by above a threshold percentage of users that prefer the artist, and wherein the instructions to select the podcast recommendation based on the podcast seed comprise instructions to:
    select the podcast to be the podcast that is played back by above the threshold percentage of users that prefer the artist.

12. The non-transitory computer readable medium of claim 8, wherein the instructions to select the podcast recommendation comprise instructions to:
    identify a podcast that has attributes corresponding to the podcast seed;
    identify a plurality of similar podcasts to the identified podcast; and generate a playlist including the plurality of similar podcasts.

13. The non-transitory computer readable medium of claim 12, wherein the instructions to identify the plurality of similar podcasts to identified podcast comprise instructions to:
- identify a social media page corresponding to the identified podcast;
- identify a plurality of users who subscribe to the social media page;
- search a provider of the social media page for another social media page corresponding to another podcast to which a threshold percentage of the plurality of users also subscribe; and
- responsive to locating, from the searching, the another social media page, add the another podcast to the plurality of similar podcasts.

14. The non-transitory computer readable medium of claim 8, wherein the first episode is selected as the podcast recommendation, and wherein the instructions to provide the podcast recommendation to the user comprise instructions to include, with the podcast recommendation, an indication of the episode as a reason for which the podcast recommendation is being made.

* * * * *